United States Patent
Zhang et al.

(10) Patent No.: US 12,375,218 B2
(45) Date of Patent: Jul. 29, 2025

(54) METHOD AND APPARATUS FOR HYBRID AUTOMATIC REPEAT REQUEST PROCEDURE

(71) Applicant: ZTE CORPORATION, Guangdong (CN)

(72) Inventors: Nan Zhang, Shenzhen (CN); Zhihong Qiu, Shenzhen (CN); Jianwu Dou, Shenzhen (CN); Wei Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 375 days.

(21) Appl. No.: 17/575,016

(22) Filed: Jan. 13, 2022

(65) Prior Publication Data

US 2022/0247520 A1 Aug. 4, 2022

Related U.S. Application Data

(63) Continuation of application No. PCT/CN2019/095983, filed on Jul. 15, 2019.

(51) Int. Cl.
*H04L 1/1829* (2023.01)
*H04L 1/1812* (2023.01)

(52) U.S. Cl.
CPC .......... *H04L 1/1854* (2013.01); *H04L 1/1812* (2013.01)

(58) Field of Classification Search
CPC ... H04L 1/1854; H04L 1/1812; H04L 1/1864; H04L 1/1822; H04W 72/23; H04W 72/1268; H04W 72/0446; H04W 84/06; H04W 56/00; H04B 7/185
See application file for complete search history.

(56) References Cited

U.S. PATENT DOCUMENTS

| | | | | |
|---|---|---|---|---|
| 9,374,148 | B2* | 6/2016 | Chen | H04B 7/0689 |
| 10,237,695 | B2* | 3/2019 | Gage | H04W 4/023 |
| 11,533,131 | B2* | 12/2022 | Choi | H04L 1/1864 |
| 11,553,537 | B1* | 1/2023 | Zewail | H04W 72/0453 |
| 11,576,209 | B2* | 2/2023 | Liu | H04L 5/0005 |
| 11,737,078 | B2* | 8/2023 | Choi | H04W 72/0453 |
| | | | | 370/329 |
| 12,052,106 | B2* | 7/2024 | Seidel | H04L 1/1861 |
| 12,119,941 | B2* | 10/2024 | Nishio | H04L 1/1621 |

(Continued)

FOREIGN PATENT DOCUMENTS

| | | |
|---|---|---|
| CN | 108631848 A | 10/2018 |
| EP | 2 949 164 A1 | 12/2015 |

(Continued)

OTHER PUBLICATIONS

First Office Action for CN Appl. No. 201980098519.9, dated Aug. 1, 2023 (with English translation, 9 pages).

(Continued)

*Primary Examiner* — Brian T O Connor
(74) *Attorney, Agent, or Firm* — Foley & Lardner LLP

(57) ABSTRACT

The present disclosure relates to methods, systems and devices for use in a user equipment includes receiving, from a base station, BS, the scheduling information for scheduled data, and determining at least one feedback process identifier of at least one feedback process associated with the scheduling information for scheduled data based on feedback process identifier information in the scheduling information and at least one indicator.

20 Claims, 5 Drawing Sheets

(56) References Cited

U.S. PATENT DOCUMENTS

| | | | | |
|---|---|---|---|---|
| 2020/0305203 | A1* | 9/2020 | Liu | H04W 72/0446 |
| 2021/0297193 | A1* | 9/2021 | Noh | H04W 74/08 |
| 2022/0045803 | A1* | 2/2022 | Lin | H04L 1/1822 |
| 2023/0089277 | A1* | 3/2023 | Liu | H04W 74/0866 |
| 2023/0354294 | A1* | 11/2023 | Choi | H04L 5/0092 |
| 2024/0154732 | A1* | 5/2024 | Noh | H04W 72/0446 |

FOREIGN PATENT DOCUMENTS

| | | | |
|---|---|---|---|
| EP | 3 857 765 | A1 | 8/2021 |
| KR | 20100135385 | A | 12/2010 |
| WO | WO-2013/017096 | A1 | 2/2013 |
| WO | WO-2020/065530 | A1 | 4/2020 |

OTHER PUBLICATIONS

International Search Report and Written Opinion on PCT/CN2019/095983, mailed Apr. 3, 2020 (8 pages).

Extended European Search Report for EP Appl. No. 19937948.8, dated Jun. 9, 2022 (15 pages).

Huawei et al., "Discussion on HARQ for NTN" 3GPP TSG RAN WG1 Meeting #97, R1-1905995, May 13, 2019, Reno, USA (4 pages).

Interdigital Inc., "Deactivating HARQ for Non-Terrestrial Networks" 3GPP TSG RAN WG1 Meeting #92bis, R1-1804857, Apr. 16, 2018, Sanya, China (3 pages).

Oppo, "Left issues on HARQ configuration for NTN" 3GPP TSG RAN WG2 Meeting #106, R2- 1905579, May 13, 2019, Reno, US (2 pages).

ZTE Corppration et al., "Consideration on HARQ for NTN" 3GPP TSG RAN WG2 Meeting #106, R2-1906115, May 13, 2019, Reno, USA (5 pages).

* cited by examiner

| NDI | HARQ process number field | HARQ process identifier |
|---|---|---|
| 0 | 0000 | 0 |
|  | 0001 | 1 |
|  | 0010 | 2 |
|  | ⋮ | |
|  | 1101 | 13 |
|  | 1110 | 14 |
|  | 1111 | 15 |
| 1 | 0000 | 16 |
|  | 0001 | 17 |
|  | 0010 | 18 |
|  | ⋮ | |
|  | 1101 | 30 |
|  | 1110 | 31 |
|  | 1111 | 32 |

METHOD AND APPARATUS FOR HYBRID AUTOMATIC REPEAT REQUEST PROCEDURE

CROSS-REFERENCE TO RELATED APPLICATION

This application claims the benefit of priority under 35 U.S.C. § 120 as a continuation of PCT Patent Application No. PCT/CN2019/095983, filed on Jul. 15, 2019, the disclosure of which is incorporated herein by reference in its entirety.

TECHNICAL FIELD

This document is directed generally to wireless communications and more particularly, to methods, apparatus and systems for performing a feedback procedure in wireless communications.

BACKGROUND

In a present communication system, a hybrid automatic repeat request (HARQ) mechanism is introduced to enhance the reliability of transmissions with the consideration of the tradeoff between efficiency and throughput. For each transmission/re-transmission, the scheduling is indicated together with a dedicated HARQ process identifier. More specifically, for a downlink (DL) transmission from a base station (BS) to a user equipment (UE), either the new transmission or re-transmission of certain data in a media access control (MAC) layer will rely on the ACK/NACK feedback from the UE. Similar operation for a uplink (UL) transmission from the UE to the BS, the data corresponding to certain HARQ process identifiers will be kept in the MAC buffer till the scheduling for new data with same HARQ process identifiers is configured. Under such a condition, in order to avoid the ambiguity of each transmission, certain number of HARQ processes should be supported in a communication system when considering a round trip time (RTT) (for example, the maximum number of HARQ processes in 5G is 16) and both UE and BS should be able to handle the data storage for the supported maximum number of HARQ processes.

However, for the communication systems with a larger round-trip time (e.g., a non-terrestrial network (NTN) communication system, such as a Geostationary Equatorial Orbit (GEO) system or a Low Earth Orbit system) or communication systems with more parallel data transmissions, the number of HARQ processes supported by the existing communication system may be a bottleneck of improving system performance.

SUMMARY

This document relates to methods, systems, and devices for HARQ procedures.

The present disclosure relates to a wireless communication method, performed by a user equipment and provided according to an embodiment of the present disclosure. The wireless communication method includes receiving, from a base station, BS, scheduling information for scheduled data, and determining at least one feedback process identifier of at least one feedback process associated with the scheduling information for scheduled data based on feedback process identifier information in the scheduling information and at least one indicator.

Various embodiments may preferably implement the following features:

Preferably, the step of determining the at least one feedback process identifier includes at least one of:
determining whether an enhanced indication function of identifiers of feedback processes is enabled based on a higher layer signaling, or
determining the at least one feedback process identifier based on the feedback process identifier information in the scheduling information and the at least one indicator when determining the enhanced indication function of the identifiers of feedback processes is enabled.

Preferably, the higher layer signaling includes at least one of a radio resource control signaling, a media access control signaling, or a system information block signaling.

Preferably, the enhanced indication function is determined to be enabled when the number of the feedback processes configured by the scheduling information exceeds a threshold.

Preferably, the at least one indicator comprises at least one of a system frame index of a system frame transmitting the data or scheduling information of the data, a system frame period value, a maximum feedback process identifier, the number of slots within single frame, a sub-frame index of a sub-frame transmitting the data or the scheduling information of the data, a sub-frame period value, the number of slots in single sub-frame, a slot index of a slot transmitting the data or the scheduling information of the data, the maximum number of sub-frames in single frame, a scalar value, or at least one bit of at least one bit field in the scheduling information.

Preferably, the at least one feedback process identifier is acquired by:

$$H\_ID = ID\_indicated + \mathrm{mod}(SFN\_ID, SFN\_p) * MaxID\_indicated$$

wherein, H_ID is the at least one feedback process identifier, ID_indicated is a non-negative integer acquired based on the feedback identifier information, SFN_ID is the system frame index of the system frame transmitting the scheduled data or the scheduling information of the scheduled data, SFN_p is the system frame period value and MaxID_indicated is the maximum feedback process identifier.

Preferably, the at least one feedback process identifier is acquired by:

$$H\_ID = ID\_indicated + \mathrm{mod}(SubF\_ID, SubF\_p) * MaxID\_indicated$$

wherein, H_ID is the at least one feedback process identifier, ID_indicated is a non-negative integer acquired based on the feedback identifier information, SubF_ID is the sub-frame index of the sub-frame transmitting the scheduled data or the scheduling information of the scheduled data, SubF_p is the sub-frame period value and MaxID_indicated is the maximum feedback process identifier.

Preferably, the at least one feedback process identifier is acquired by:

$$H\_ID = ID\_indicated * Max\_slot\_F + slotID$$

wherein, H_ID is the at least one feedback process identifier, ID_indicated is a non-negative integer acquired based on the feedback identifier information, Max_slot_F is the number of slots within single frame and slotID is the slot index of the slot transmitting the scheduled data or the scheduling information of the scheduled data.

Preferably, the slotID is the slot index of the slot transmitting the scheduled data or the scheduling information of the scheduled data in each frame when the scalar value is not larger than the number of slots within single frame and is the slot index of the slot transmitting the scheduled data or the scheduling information of the scheduled data in each sub-frame when the scalar value is not larger than the number of slots within single sub-frame.

Preferably, when the scalar value is larger than the number of slots within single frame, the slotID is acquired by:

slotID=Max_slot_$F$*SFN_ID+slotID_local wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data.

Preferably, when the scalar value is larger than the number of slots within single frame, the slotID is acquired by:

slotID=Max_slot_$F$*(SFN_ID−1)+slotID_local wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data.

Preferably, wherein the system frame index, the sub-frame index or the slot index is adjusted by a ratio when the data and the at least one indicator are transmitted by different sub-carrier configurations.

Preferably, the at least one bit field in the scheduling information comprises a first new data indicator, NDI, field for indicating whether the scheduled data in the first transport block, TB, is new, a first redundancy version, RV, field for a channel coding of the first TB, a second NDI field for indicating whether the scheduled data in the second TB is new, a second RV field for a channel coding of the second TB, a modulation and coding scheme, MCS, field for indicating the modulation and coding scheme of the second TB, a downlink assignment index field, a transport power command field for physical uplink control channel, PUCCH, a PUCCH resource indicator field or physical downlink shared channel, PDSCH, to HARQ feedback timing indicator field.

Preferably, the at least one indicator is a higher-order bit in a combination of the feedback process identifier information and the at least one indicator.

Preferably, an order of the at least one indicator in the combination of the feedback process identifier information and the at least one indicator follows an order of the at least one indicator in the scheduling information, an inverse order of the at least one indicator in the scheduling information, an ascend order of bit field length of the at least one indicator, or a descend order of bit field length of the at least one indicator.

The present disclosure relates to a wireless communication method, performed by a base station and provided according to an embodiment of the present disclosure. The wireless communication method includes transmitting, to a user equipment, scheduling information for scheduled data and at least one indicator, wherein at least one feedback process identifier of at least one feedback process associated with the scheduling information for scheduled data is determined based on feedback process identifier information in the scheduling information and the at least one indicator.

Various embodiments may preferably implement the following features:

Preferably, the wireless communication method further includes transmitting, to the UE, a higher layer signaling to indicate an enhanced indication function of the identifiers of feedback processes is enabled and to make the UE determine the at least one feedback process identifier of at least one feedback process associated with the scheduling information for scheduled data based on feedback process identifier information in the scheduling information and the at least one indicator.

Preferably, the higher layer signaling includes at least one of a radio resource control signaling, a media access control signaling, or a system information block signaling.

Preferably, the enhanced indication function is determined to be enabled when the number of the feedback processes configured by the scheduling information exceeds a threshold.

Preferably, the at least one indicator comprises at least one of a system frame index of a system frame transmitting the data or scheduling information of the data, a system frame period value, a maximum feedback process identifier, the number of slots within single frame, a sub-frame index of a sub-frame transmitting the data or the scheduling information of the data, a sub-frame period value, the number of slots in single sub-frame, a slot index of a slot transmitting the data or the scheduling information of the data, the maximum number of sub-frames in single frame, a scalar value, or at least one bit of at least one bit field in the scheduling information Preferably, the at least one feedback process identifier is acquired by:

$H\_ID=ID\_indicated+mod(SFN\_ID,SFN\_p)*MaxID\_indicated$ wherein, H_ID is the at least one feedback process identifier, ID_indicated is a non-negative integer acquired based on the feedback identifier information, SFN_ID is the system frame index of the system frame transmitting the scheduled data or the scheduling information of the scheduled data, SFN_p is the system frame period value and MaxID_indicated is the maximum feedback process identifier.

Preferably, the at least one feedback process identifier is acquired by:

$H\_ID=ID\_indicated+mod(SubF\_ID,SubF\_p)*MaxID\_indicated$ wherein, H_ID is the at least one feedback process identifier, ID_indicated is a non-negative integer acquired based on the feedback identifier information, SubF_ID is the sub-frame index of the sub-frame transmitting the scheduled data or the scheduling information of the scheduled data, SubF_p is the sub-frame period value and MaxID_indicated is the maximum feedback process identifier.

Preferably, the at least one feedback process identifier is acquired by:

$H\_ID=ID\_indicated*Max\_slot\_F+slotID$ wherein, H_ID is the at least one feedback process identifier, ID_indicated is a non-negative integer acquired based on the feedback identifier information, Max_slot_F is the number of slots within single frame and slotID is the slot index of the slot transmitting the scheduled data or the scheduling information of the scheduled data.

Preferably, the slotID is the slot index of the slot transmitting the scheduled data or the scheduling information of the scheduled data in each frame when the scalar value is not larger than the number of slots within single frame and is the slot index of the slot transmitting the scheduled data or the scheduling information of the scheduled data in each sub-frame when the scalar value is not larger than the number of slots within single sub-frame.

Preferably, when the scalar value is larger than the number of slots within single frame, the slotID is acquired by:

slotID=Max_slot_$F$*SFN_ID+slotIDlocal wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data.

Preferably, when the scalar value is larger than the number of slots within single frame, the slotID is acquired by:

slotID=Max_slot_$F$*(SFN_ID−1)+slotID_local wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data.

Preferably, wherein the system frame index, the sub-frame index or the slot index is adjusted by a ratio when the data and the at least one indicator are transmitted by different sub-carrier configurations.

Preferably, the at least one bit field in the scheduling information comprises a first new data indicator, NDI, field for indicating whether the scheduled data in the first transport block, TB, is new, a first redundancy version, RV, field for a channel coding of the first TB, a second NDI field for indicating whether the scheduled data in the second TB is new, a second RV field for a channel coding of the second TB, a modulation and coding scheme, MCS, field for indicating the modulation and coding scheme of the second TB, a downlink assignment index field, a transport power command field for physical uplink control channel, PUCCH, a PUCCH resource indicator field or physical downlink shared channel, PDSCH, to HARQ feedback timing indicator field.

Preferably, the at least one indicator is a higher-order bit in a combination of the feedback process identifier information and the at least one indicator.

Preferably, an order of the at least one indicator in the combination of the feedback process identifier information and the at least one indicator follows an order of the at least one indicator in the scheduling information, an inverse order of the at least one indicator in the scheduling information, an ascend order of bit field length of the at least one indicator, or a descend order of bit field length of the at least one indicator.

The present disclosure relates to a wireless communication method, performed by a base station and provided according to an embodiment of the present disclosure. The wireless communication method includes transmitting, to a user equipment, scheduling information for scheduled data and at least one indicator, wherein at least one feedback process identifier of at least one feedback process associated with the scheduling information for scheduled data is determined based on feedback process identifier information in the scheduling information and the at least one indicator.

The present disclosure relates to a wireless communication method, performed by a user equipment and provided according to an embodiment of the present disclosure. The wireless communication method includes receiving, from a base station, scheduling information for scheduled data; and disabling at least one feedback process associated with the scheduling information for scheduled data based on at least one indicator.

Various embodiments may preferably implement the following features:

Preferably, the wireless communication method further includes at least one of:
 determining whether a feedback disabling function corresponding to the at least one feedback process is enabled based on a higher layer signaling; or
 disabling the at least one feedback process associated with the scheduling information for scheduled data based on the at least one indicator when the feedback disabling function is enabled.

Preferably, all of the at least one feedback process associated with the scheduling information for the scheduled data is disabled when the at least one indicator is absent.

Preferably, the at least one indicator indicates one of a bitmap indicating at least one feedback enabling status corresponding to at least one feedback process identifier of the at least one feedback process, range information indicating a feedback process identifier range, a list of feedback process identifiers or the number of the at least one feedback process.

The present disclosure relates to a wireless communication method, performed by a base station and provided according to an embodiment of the present disclosure. The wireless communication method includes transmitting, to a user equipment, scheduling information for scheduled data and at least one indicator, wherein at least one feedback process associated with the scheduling information for scheduled data is disabled based on the at least one indicator.

Various embodiments may preferably implement the following features:

Preferably, the wireless communication method further includes transmitting, to the user equipment, a higher layer signaling to indicate whether a feedback disabling function corresponding to the at least one feedback process is enabled, wherein the at least one feedback process is disabled based on the at least one indicator when the feedback disabling function corresponding to the at least one feedback process is enabled.

Preferably, all of the at least one feedback process associated with the scheduling information for the scheduled data is disabled when the at least one indicator is absent.

Preferably, the at least one indicator indicates one of a bitmap indicating at least one feedback enabling status corresponding to at least one feedback process identifier of the at least one feedback process, range information indicating a feedback process identifier range, a list of feedback process identifiers or the number of the at least one feedback process.

The present disclosure relates to a wireless communication method, performed by a user equipment and provided according to an embodiment of the present disclosure. The wireless communication method includes receiving, from a base station, scheduling information for scheduled data; and disabling at least one feedback process associated with the scheduling information for scheduled data based on the scheduling information.

Various embodiments may preferably implement the following features:

Preferably, the wireless communication method further includes at least one of:
 determining whether a feedback disabling function corresponding to the at least one feedback process is enabled based on a higher layer signaling; and disabling the at least one feedback process associated with the scheduling information for scheduled data based on the scheduling information when the feedback disabling function is enabled.

Preferably, the at least one feedback process associated with the scheduling information for scheduled data is disabled based on at least one bit field of the scheduling information.

Preferably, the at least one feedback process is disabled when the at least one bit field of the at least one feedback process is absent.

Preferably, the at least one bit field comprises at least one of a new data indicator, NDI, field configured to indicate whether the data corresponding to the at least one feedback process is new, a redundancy version, RV. field configured to indicate at least one channel coding of the data corresponding to the at least one feedback process, a feedback process number field configured to indicate at least one feedback process identifier of the at least one feedback process, a physical uplink control channel, PUCCH, resource indicator field or physical downlink shared channel, PDSCH, to HARQ feedback timing indicator field.

Preferably, the at least one feedback process is disabled when the NDI field of the at least one feedback process indicates the data corresponding to the at least one feedback process is new and the RV field of the at least one feedback process indicates 1.

Preferably, wherein the at least one feedback process is disabled when the NDI field of the at least one feedback process indicates the data corresponding to the at least one feedback process is new and a value of conducting an XOR function between the RV field and a higher layer signaling is 1, wherein the higher layer signaling is configured to indicate whether the feedback disabling function corresponding to the at least one feedback process is enabled.

Preferably, the at least one feedback process is disabled when the NDI field of the at least one feedback process indicates the data corresponding to the at least one feedback process is new and the RV field of the at least one feedback process indicates 3.

Preferably, the at least one feedback process is disabled based on the most significant field of the feedback process identifier field.

Preferably, the at least one feedback process is disabled when the resource indicator field or the feedback timing field is a predefined pattern.

Preferably, the scheduling information comprises at least one of a radio network temporary identifier (RNTI) or a control-resource set (CORSET) identification for indicating the disabled at least one feedback process.

The present disclosure relates to a wireless communication method, performed by a base station and provided according to an embodiment of the present disclosure. The wireless communication method includes transmitting, to a user equipment, scheduling information for scheduled data; wherein at least one feedback process associated with the scheduling information for scheduled data is disabled based on the scheduling information.

Various embodiments may preferably implement the following features:

Preferably, the wireless communication method further includes transmitting a higher layer signaling to indicate whether a feedback disabling function corresponding to the at least one feedback process is enabled based on a higher layer signaling, wherein the at least one feedback process is disabled based on the scheduling information when the feedback disabling function corresponding to the at least one feedback process is enabled.

Preferably, the at least one feedback process associated with the scheduling information for scheduled data is disabled based on at least one bit field of the scheduling information.

Preferably, the at least one feedback process is disabled when the at least one bit field of the at least one feedback process is absent.

Preferably, the at least one bit field comprises at least one of a new data indicator, NDI, field configured to indicate whether the data corresponding to the at least one feedback process is new, a redundancy version, RV. field configured to indicate at least one channel coding of the data corresponding to the at least one feedback process, a feedback process number field configured to indicate at least one feedback process identifier of the at least one feedback process, a physical uplink control channel, PUCCH, resource indicator field or physical downlink shared channel, PDSCH, to HARQ feedback timing indicator field.

Preferably, the at least one feedback process is disabled when the NDI field of the at least one feedback process indicates the data corresponding to the at least one feedback process is new and the RV field of the at least one feedback process indicates 1.

Preferably, wherein the at least one feedback process is disabled when the NDI field of the at least one feedback process indicates the data corresponding to the at least one feedback process is new and a value of conducting an XOR function between the RV field and a higher layer signaling is 1, wherein the higher layer signaling is configured to indicate whether the feedback disabling function corresponding to the at least one feedback process is enabled.

Preferably, the at least one feedback process is disabled when the NDI field of the at least one feedback process indicates the data corresponding to the at least one feedback process is new and the RV field of the at least one feedback process indicates 3.

Preferably, the at least one feedback process is disabled based on the most significant field of the feedback process identifier field.

Preferably, the at least one feedback process is disabled when the resource indicator field or the feedback timing field is a predefined pattern.

Preferably, the scheduling information comprises at least one of a radio network temporary identifier (RNTI) or a control-resource set (CORSET) identification for indicating the disabled at least one feedback process.

The present disclosure relates to a network device comprising:
a communication unit configured to receive, from a base station, scheduling information for scheduled data; and
a processor configured to determine the at least one feedback process identifier of at least one feedback process associated with the scheduling information for scheduled data based on feedback process identifier information in the scheduling information and at least one indicator.

Various embodiments may preferably implement the following features:

Preferably, the processor and/or the network device also includes a storage unit having program code stored therein, being configured to, when being executed, cause the processor to perform any of the aforementioned method steps.

The present disclosure relates to a network node comprising:
 a communication unit configured to transmit, to a user equipment, scheduling information for scheduled data and at least one indicator, wherein at least one feedback process identifier of at least one feedback process associated with the scheduling information for scheduled data is determined based on feedback process identifier information in the scheduling information and the at least one indicator.

Various embodiments may preferably implement the following features:

Preferably, the network node further includes a processor being configured to perform any of the aforementioned method steps.

The present disclosure relates to a network device comprising:
 a communication unit configured to receive, from a network node, scheduling information for scheduled data; and
 a processor configured to disable at least one feedback process associated with the scheduling information for scheduled data based on at least one indicator.

Various embodiments may preferably implement the following features:

Preferably, the processor and/or the network device also includes a storage unit having program code stored therein, being configured to, when being executed, cause the processor to perform any of the aforementioned method steps.

The present disclosure relates to a network node comprising:
 a communication unit configured to transmit, to a network device, scheduling information for scheduled data and at least one indicator, wherein at least one feedback process associated with the scheduling information for scheduled data is disabled based on the at least one indicator.

Various embodiments may preferably implement the following features:

Preferably, the network node further includes a processor being configured to perform any of the aforementioned method steps.

The present disclosure relates to a network device comprising:
 a communication unit configured to receive, from a network node, scheduling information for scheduled data; and
 a processor configured to disable at least one feedback process associated with the scheduling information for scheduled data based on the scheduling information.

Various embodiments may preferably implement the following features:

Preferably, the processor and/or the network device also includes a storage unit having program code stored therein, being configured to, when being executed, cause the processor to perform any of the aforementioned method steps.

The present disclosure relates to a network node comprising:
 a communication unit configured to transmit, to a network device, scheduling information for scheduled data and at least one indicator, wherein at least one feedback process associated with the scheduling information for scheduled data is disabled based on the scheduling information.

Various embodiments may preferably implement the following features:

Preferably, the network node further includes a processor being configured to perform any of the aforementioned method steps.

The above and other aspects and their implementations are described in greater detail in the drawings, the descriptions, and the claims.

DETAILED DESCRIPTION

Various exemplary embodiments of the present disclosure are described below with reference to the accompanying figures to enable a skilled person to make and use the present disclosure. As would be apparent to those of ordinary skill in the art, after reading the present disclosure, various changes or modifications to the examples described herein can be made without departing from the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
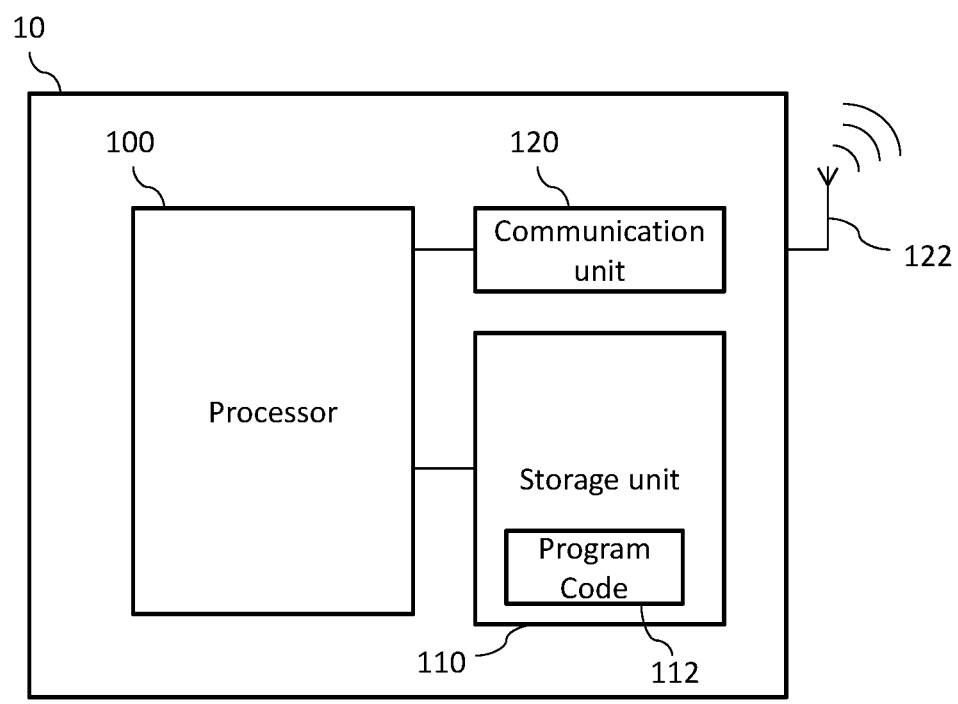
FIG. 1 shows an example of a schematic diagram of a network device according to an embodiment of the present disclosure.

FIG. 1 relates to a schematic diagram of a network device 10 according to an embodiment of the present disclosure. The network device 10 may be a user equipment (UE), a mobile phone, a laptop, a tablet computer, an electronic book or a portable computer system and is not limited herein. The network device 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via an antenna 122 shown in FIG. 1.

In an embodiment, the storage unit 110 and the program code 112 may be omitted and the processor 100 may include a storage unit with stored program code.

Figure 4:
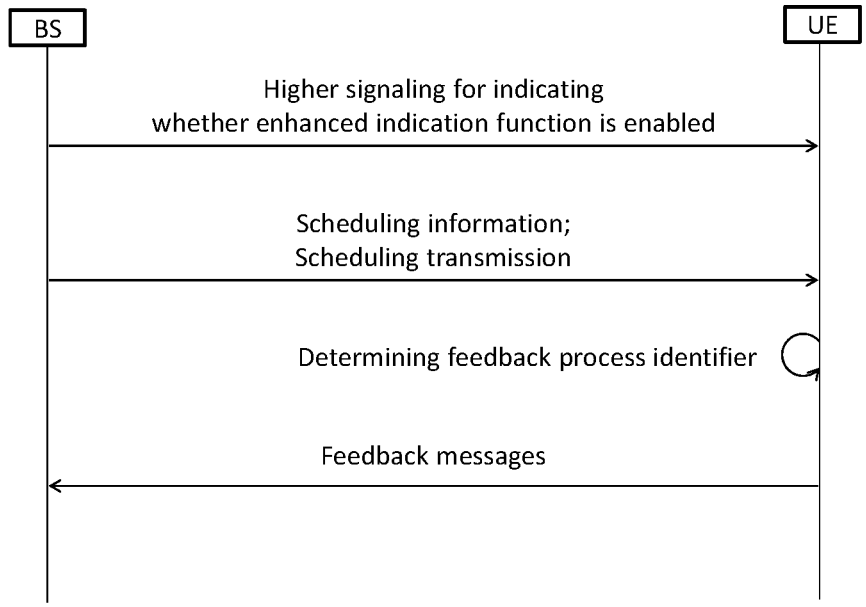
FIG. 4 shows an example of a process according to an embodiment of the present disclosure.
Figure 5:
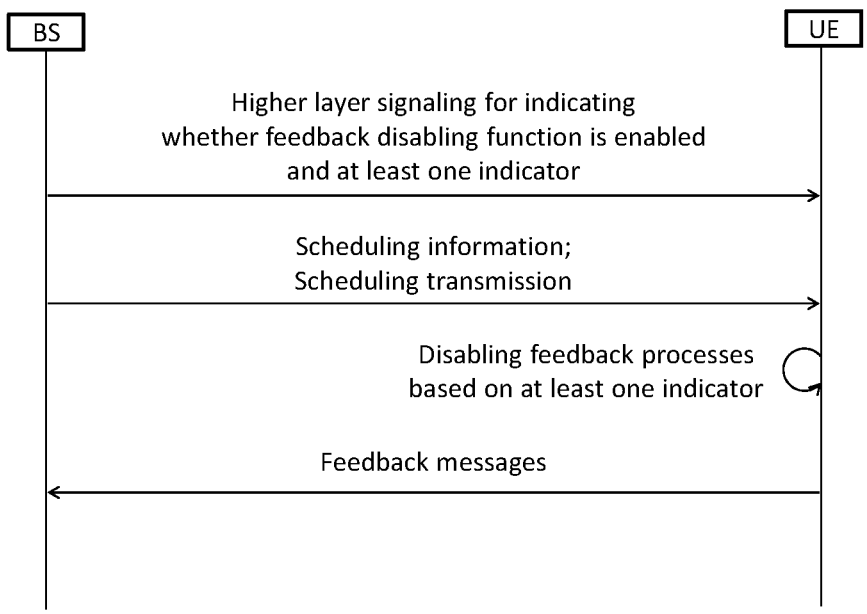
FIG. 5 shows an example of a process according to an embodiment of the present disclosure.
Figure 7:
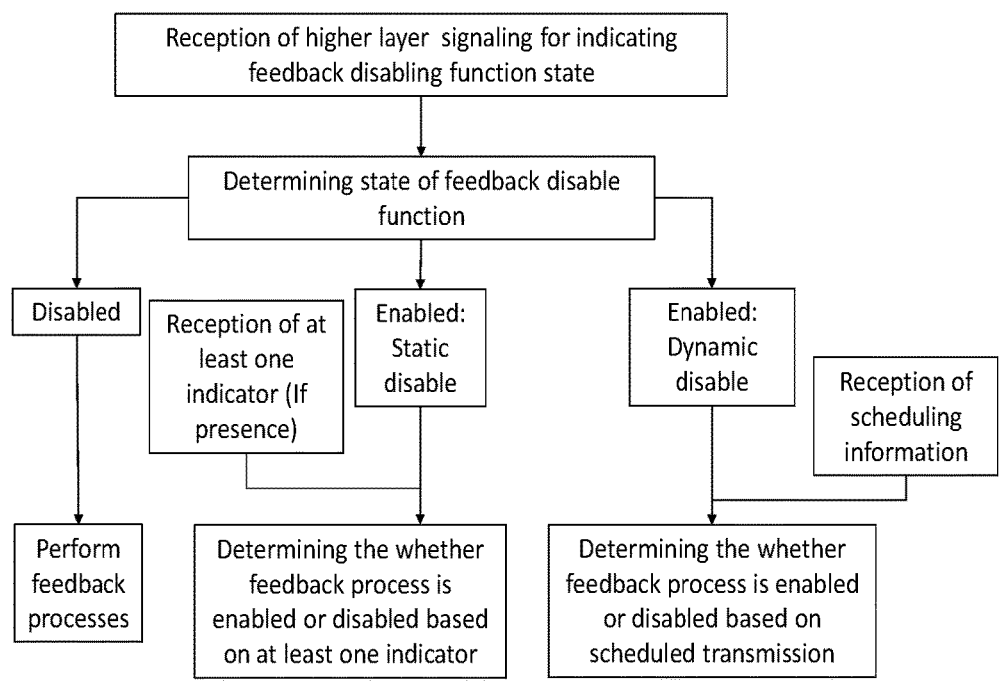
FIG. 7 shows an example of a process according to an embodiment of the present disclosure.

The processor 100 may implement any one of the steps in embodiments shown in FIGS. 4, 5 and 7 on the network device 10.

The communication unit 120 may be a transceiver. The communication unit 120 may as an alternative or in addition be combining a transmitting unit and a receiving unit configured to transmit and to receive, respectively, signals to and from a network node (e.g. a BS).

Figures 2, 3:
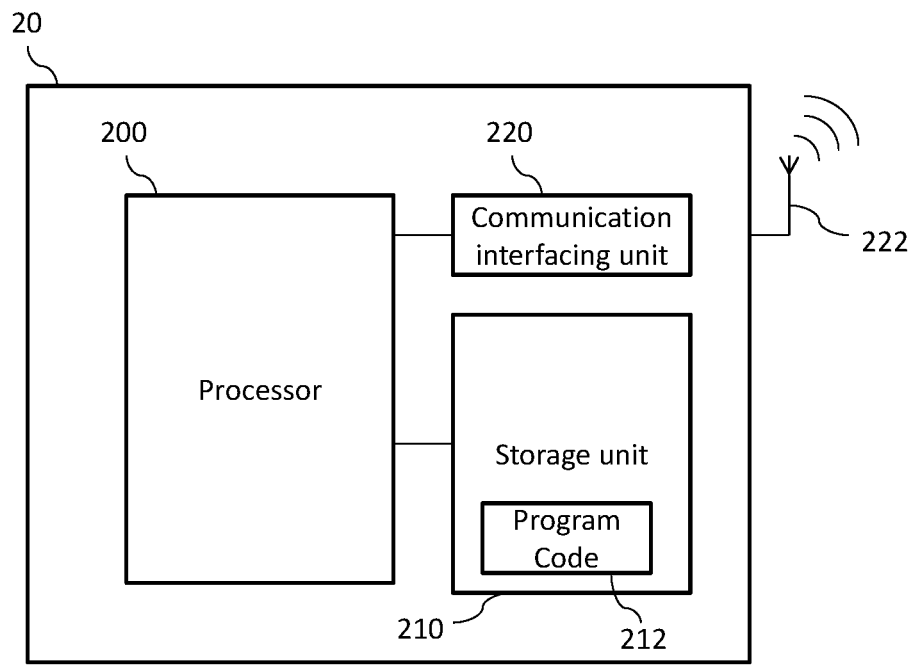
FIG. 2 shows an example of a schematic diagram of a network node according to an embodiment of the present disclosure.
FIG. 3 shows an example of a table according to an embodiment of the present disclosure.

FIG. 2 relates to a schematic diagram of a network node 20 according to an embodiment of the present disclosure. The network node 20 may be a base station (BS), a network entity, a Mobility Management Entity (MME), Serving Gateway (S-GW), Packet Data Network (PDN) Gateway (P-GW), or Radio Network Controller (RNC), and is not limited herein. The network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via an antenna 222 shown in FIG. 2.

In an embodiment, the storage unit 210 and the program code 212 may be omitted. The processor 200 may include a storage unit with stored program code.

Figure 6:
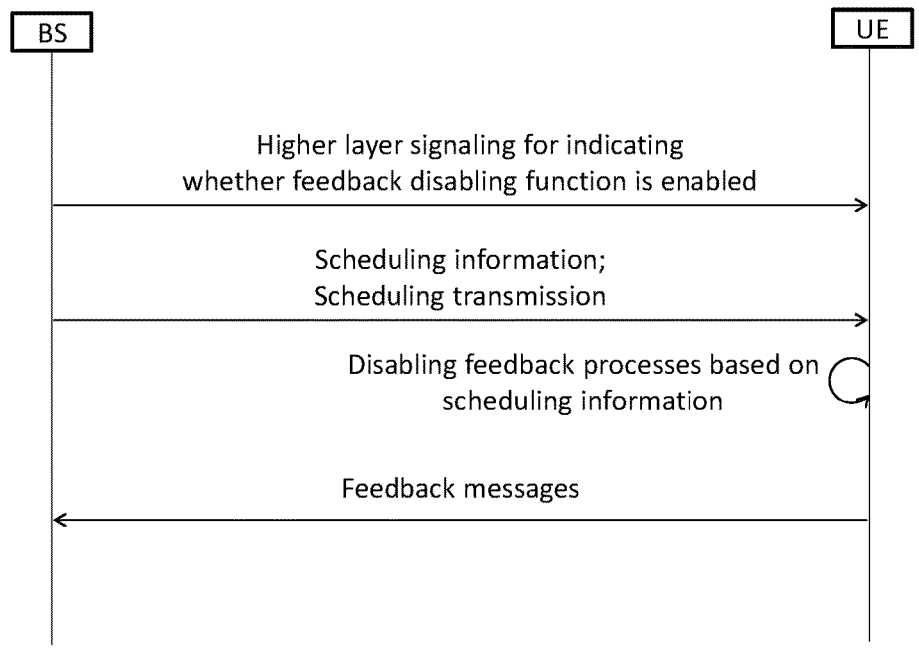
FIG. 6 shows an example of a process according to an embodiment of the present disclosure.
Figure 8:
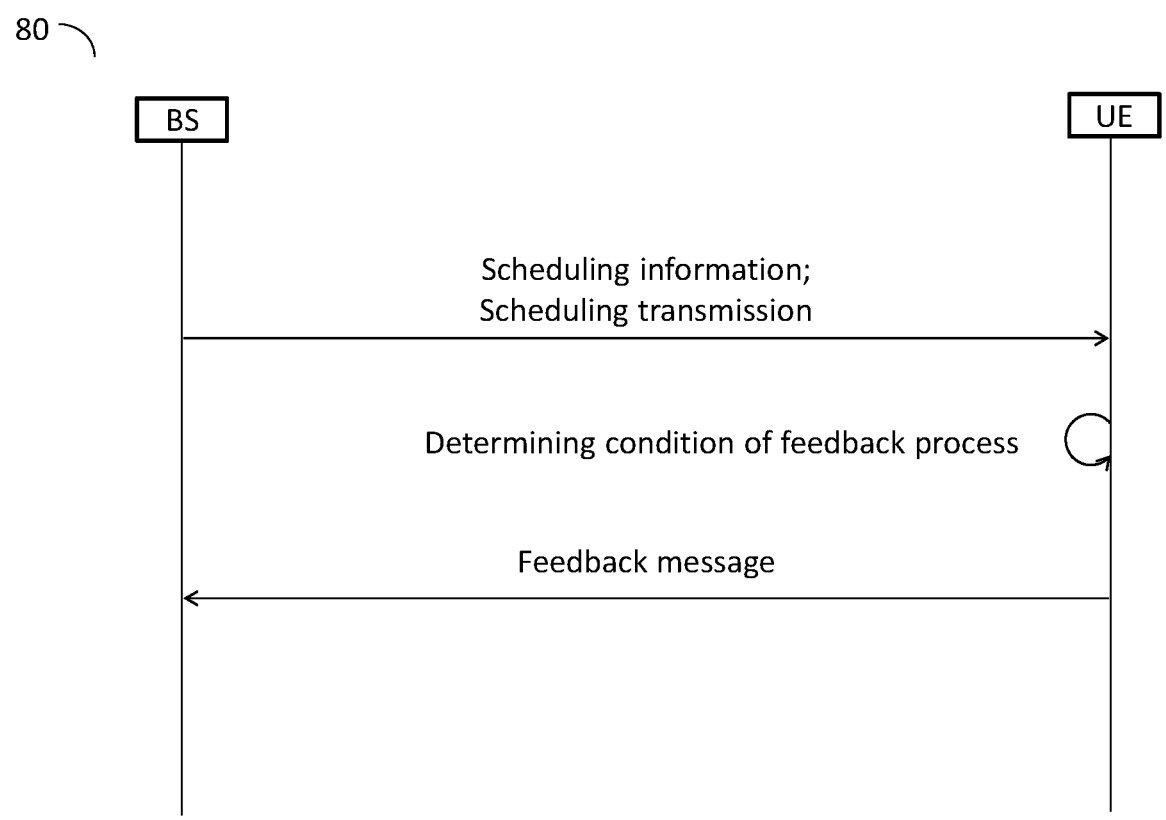
FIG. 8 shows an example of a process according to an embodiment of the present disclosure.

The processor 200 may implement any steps described in embodiments shown in FIGS. 4, 6 and 8 on the network node 20.

The communication unit 220 may be a transceiver. The communication unit 220 may as an alternative or in addition be combining a transmitting unit and a receiving unit configured to transmit and to receive, respectively, signals to and from a network device (e.g. a UE).

In an embodiment, the present disclosure provides a method to enable the indication of the number of HARQ processes supported by a wireless communication system, especially, that supports multiple levels of the maximum number of the HARQ processes. In this embodiment, a UE may firstly determine whether an enhanced indication function of identifiers of HARQ processes supported by the wireless communication system is enabled. For example, a BS may transmit a higher layer signaling (e.g. at least one of a radio resource control (RRC) signaling, a media access control (MAC) signaling or a system information block (SIB) signaling) to the UE for indicating whether the enhanced indication function of the identifiers of HARQ processes is enabled. In an embodiment, the UE may determine whether the enhanced indication function of the identifiers of HARQ processes is enabled based on the number of the HARQ processes configured by the BS. When the configured number of the HARQ processes exceeds a threshold, the UE determines the enhanced indication function of the identifiers of HARQ processes is enabled; otherwise, the UE determines the enhanced indication function is disabled. In an example, the threshold is configured by the BS. For example, the threshold can be indicated by additional configurations from the BS. In another example, the threshold may be implicitly defined. For example, the threshold may be equal to the value of the maximum supported HARQ process identifier limited by legacy capability. For example, the threshold may be 16 once the maximum HARQ process identifier supported by corresponding indication field (e.g., bit field in downlink control information (DCI)) is 16.

In an embodiment, when determining the enhanced indication function of the identifiers of HARQ processes is enabled, the UE may determine the number of the HARQ processes supported by the wireless communication system is at an increased level. Under such a condition, after the UE receives scheduling information for a scheduling transmission of scheduled data, the UE determines at least one HARQ process identifier H_ID corresponding to at least one HARQ process associated with scheduled data based on not only a HARQ process number field in the scheduling information but also at least one indicator. Note that, the UE may receive the scheduling information together with configuration information of the scheduled transmission. For example, the UE may receive control information (e.g. downlink control information (DCI)) including the scheduling information and the control information for the scheduled transmission.

In an embodiment, the at least one indicator may include related indexes of transmitting the data or the scheduling information. For example, the at least one indicator comprises at least one of a system frame index SFN_ID of a system frame transmitting the scheduled data or the scheduling information of the scheduled data, a system frame period value SFN_p configured by the higher layer signaling, a maximum HARQ process identifier MaxID_indicated, the number Max_slot_F of slots within single frame, a sub-frame index SubF_ID of a sub-frame transmitting the scheduled data or the scheduling information of the scheduled data, a sub-frame period value SubF_p configured by the higher layer signaling, the number Max_slot_subF of slots in single sub-frame, a slot index slotID of a slot transmitting the scheduled data or the scheduling information of the scheduled data, the maximum number Max_sub-Fra_Frame of sub-frames in single frame, or a value Scalar which is a positive integer configured by the higher layer signaling.

In an embodiment, the at least one HARQ process ID H_ID corresponding to scheduled data is determined by:

$$H\_ID = ID\_indicated + \mathrm{mod}(SFN\_ID, SFN\_p) * MaxID\_indicated$$

where ID_indicated is a non-negative integer acquired based on the HARQ process number field in the scheduling information, the function mod(h,k) is the modulo function, i.e a function of returning the remainder after division of input variable h by the input variable k and may also be shown as "h mod k", the system frame period value SFN_p is configured by the higher layer signaling and associated with a system frame period and the maximum HARQ process identifier MaxID_indicated is the maximum value indicated by the HARQ process number field in the scheduling information. By adopting this formula, the at least one HARQ process identifier H_ID becomes further proportional to the position of the system frame transmitting the scheduled data or the scheduling information of the scheduled data in each system frame period.

In an embodiment, the at least one HARQ process identifier H_ID corresponding to scheduled data is determined by:

$$H\_ID = \mathrm{mod}(ID\_indicated, Max\_slot\_F) + \mathrm{mod}(SFN\_ID, SFN\_p) * \min(MaxID\_indicated, Max\_slot\_F)$$

where ID_indicated is a non-negative integer acquired based on the HARQ process number field in the scheduling information, the function mod(h,k) is a function of returning the remainder after division of the input variable h by the input variable k, the function min (a, b) is a function of returning a smaller value between input variables a and b.

In an embodiment, the at least one HARQ process identifier H_ID corresponding to scheduled data is determined by:

$$H\_ID = ID\_indicated + \mathrm{mod}(SubF\_ID, SubF\_p) * MaxID\_indicated$$

where ID_indicated is a non-negative integer acquired based on the HARQ process number field in the scheduling information and the sub-frame period value SubF_p is configured by the higher layer signaling and associated to a sub-frame period. According to this formula, the at least one HARQ process identifier H_ID becomes further proportional to the position of the sub-frame transmitting the scheduled data or the scheduling information of the scheduled data in each sub-frame period.

In an embodiment, the at least one HARQ process identifier H_ID corresponding to scheduled data is determined by:

$$H\_ID = \mathrm{mod}(ID\_indicated, Max\_slot\_F) + \mathrm{mod}(SubF\_ID, SubF\_p) * \min(MaxID\_indicated, Max\_slot\_F)$$

where ID_indicated is a non-negative integer acquired based on the HARQ process number field in the scheduling information and the sub-frame period value SubF_p is configured by the higher layer signaling and associated to a sub-frame period, the maximum HARQ process identifier MaxID_indicated is the maximum value indicated by the HARQ process number field in the scheduling information.

In an embodiment, the at least one HARQ process identifier H_ID corresponding to scheduled data is determined by:

$$H\_ID = ID\_indicated * Max\_slot\_F + slotID$$

where ID_indicated is a non-negative integer acquired based on the HARQ process number field in the scheduling information.

In an embodiment, the at least one HARQ process identifier H_ID corresponding to scheduled data is determined by:

$$H\_ID = ID\_indicated * Max\_slot\_subF + slotID$$

where ID_indicated is a non-negative integer acquired based on the HARQ process number field in the scheduling information.

In an embodiment, the at least one HARQ process identifier H_ID corresponding to scheduled data is determined by:

$$H\_ID = ID\_indicated * Max\_slot\_F + slotID + SubF\_ID * Max\_subfra\_frame$$

where ID_indicated is a non-negative integer acquired based on the HARQ process number field in the scheduling information.

In an embodiment, the at least one HARQ process identifier H_ID corresponding to scheduled data is determined by:

$$H\_ID = ID\_indicated * Scalar + \mathrm{mod}(slotID, Scalar)$$

where ID_indicated is a non-negative integer acquired based on the HARQ process number field in the scheduling information, the value Scalar is a positive integer configured by the higher layer signaling (e.g. RRC signaling). In this formula, the slot index slotID is determined based on a relationship between the value Scalar and the maximum number Max_slot_F or Max_slot_subF. When the value Scalar is not greater than the maximum number Max_slot_F of the maximum number of slots in single frame, the slot index slotID is a slot index slotID_local of the slot transmitting the data or the scheduling information of the data in each frame. Similarly, the slot index slotID is the slot index slotID_local of the slot transmitting the data or the scheduling information of the data in each sub-frame when the value Scalar is not greater than the maximum number Max_slot_subF of the maximum number of slots in single sub-frame. When the value Scalar is greater than the maximum number Max_slot_F of the maximum number of slots in single frame, the slot index slot ID is acquired by:

$$slotID = Max\_slot\_F * (SFN\_ID - 1) + slotID\_local$$

When the value Scalar is greater than the maximum number Max_slot_subF of the maximum number of slots in single sub-frame, the slot index slot ID is acquired by:

$$slotID = Max\_slot\_subF * (SFN\_ID - 1) + slotID\_local$$

Note that the system frame index SFN_ID, the sub-frame index SubF_ID or the slot index slotID in the aforementioned formulas may need to be adjusted when the data and the scheduling information of transmitting the data are transmitted by different sub-carrier configurations (e.g. different bandwidth part (BWP) or component carrier (CC) configurations). For example, the system frame index SFN_ID, the sub-frame index SubF_ID or the slot index slotID is adjusted by a ratio between sub-carrier spaces of the sub-carrier configurations transmitting the data and the scheduling information. In an embodiment, the ratio may be calculated by $$\frac{2^{\mu_1}}{2^{\mu_0}},$$

where $\mu_0$ refers to the sub-carrier configuration used for transmitting the data and $\mu_1$ refers to the sub-carrier configuration used for transmitting the scheduling information. For example, $\mu_0$ and $\mu_1$ are configured to implicitly indicate configurations of sub-carrier spaces of transmitting the data and the scheduling information.

In an embodiment, the at least one indicator used for determining the at least one HARQ process identifier may be at least one bit of at least one bit field in the scheduling information including reserved bit fields. The at least one HARQ process identifier may be determined based on a combination of the HARQ process number field and the at least one indicator. For example, the at least one indicator may comprise at least one bit of at least one of a new data indicator, NDI, field for the first transport block, TB, a redundancy version, RV, field for the first TB, a NDI field for the second TB, a RV field for the second TB, a modulation and coding scheme, MCS, field for the second TB, a downlink assignment index field, a transport power command field for physical uplink control channel, PUCCH, a PUCCH resource indicator field or a physical downlink shared channel, PDSCH, to HARQ feedback timing indicator field. The NDI field is configured to indicate whether the corresponding data (e.g. the data of the first or second TB) is new. The RV field is configured to indicate channel coding of the corresponding data (e.g. the data of the first or second TB). The MCS field is configured to indicate the MCS of the corresponding data.

In an embodiment, the at least one indicator includes at least one bit field in the scheduled data, e.g., transmitted with PDSCH. In this example, the at least one indicator may be a higher order bit (i.e. the bit with greater weighting) when combining with the HARQ process number field. In one example, the bit field of at least one indicator is separately coded with bits located in the PDSCH. In one example, the bit field of at one indicator is allocated closed to the de-modulation reference signal (DMRS), e.g., along the first symbol of DMRS. In one example, the bit field of at least one indicator is located at first N resource for the PDSCH transmission, which may be expected to be decoded by UE firstly than the remaining bits for PDSCH.

In an embodiment, the at least one indicator includes at least one bit of one bit field in the scheduling information (e.g. the DCI) including also the reserved bits. In this example, the at least one indicator may be a higher-order bit (i.e. the bit with greater weighting) when combining with the HARQ process number field.

For example, the at least one indicator includes the NDI field (1 bit) for the first TB. FIG. 3 shows an example of the HARQ process identifiers indicated by the combination of the NDI field and the HARQ process number field. In this example, the NDI field is the most significant bit (MSB) of the combination of the NDI field and the HARQ process number field. By further utilizing the NDI field to indicate the HARQ process identifiers, the number of supported HARQ process identifiers is doubled.

In an embodiment, the at least one indicator includes at least one bit of the RV field (2 bits) for the first TB. For example, the at least one indicator may include 1 bit (either the MSB or the lowest significant bit (LSB)) of the RV field for the first TB. Or, the at least one indicator includes all 2 bits of the RV field for the first TB. In this embodiment, the 2 bits of the RV field are the higher-order bits when combining with the HARQ process number field.

Similarly, the at least one indicator may include at least one bit of one of NDI field for the second TB, RV field for the second TB, the MCS field for second TB, the downlink assignment index field, a transport power command field for PUCCH, a PUCCH resource indicator field or PDSCH-to-HARQ feedback timing indicator field.

In an embodiment, the at least one indicator may include multiple bit fields of the scheduling information. For example, the at least one indicator may include the NDI field and the RV field for the second TB, include the MCS field and the NDI field for the second TB, include the MCS field and the RV field, or include the MCS field, the RV field and the NDI field for the second TB.

In the embodiment of the at least one indicator including multiple bit fields of the scheduling information, an order of the multiple bit fields in the combination of the at least one indicator and the HARQ process number field may be an order of the multiple bit fields in the scheduling information, an inverse order of the multiple bit fields in the scheduling information, an ascend order of the bit lengths of the multiple bit fields or a descend order of the bit lengths of the multiple bit fields. For example, when the at least one indicator include the MCS field, the RV field and the NDI field for the second TB, the order of the MCS field, the RV field and the NDI field for the second TB in the combination with the HARQ process number field may be an order of MCS field (5 bits), RV field (2 bits) and NDI field (1 bits) if the descending order of the bit lengths is adopted, an order of NDI field, the RV field and the MCS field if the ascending order of the bit lengths is adopted, an order of the MCS field, the NDI field and the RV field if the order in the scheduling information is adopted or an order of the RV field, the NDI field and the MCS field if the inverse order in the scheduling information is adopted. As a result, the number of supported HARQ process identifiers is increased without signal overhead.

Similarly, the at least one indicator may include at least two of the NDI field for the first TB, the RV field for the first TB, the NDI field for the second TB, the RV field for the second TB, the MCS field for second TB, the downlink assignment index field, a transport power command field for PUCCH, the PUCCH resource indicator field or the PDSCH-to-HARQ feedback timing indicator field. In combination with the embodiment of the at least one indicator including at least one bit of single field in the scheduling information, the at least one indicator may include at least one bit of at least one bit field in the scheduling information.

In an embodiment, the number of bit fields included in the at least one indicator is determined by the maximum HARQ process identifier supported by the wireless communication system and bit length of each bit field. For example, in case of the HARQ process number field in the scheduling information includes 4 bits, the at least one indicator may include the NDI field (1 bit) if the maximum HARQ process identifier is up to 32. Similarly, the at least one indicate may change to include the RV field (2 bits) if the maximum HARQ process identifier is up to 64, to include the NDI and RV fields if the maximum HARQ process identifier is up to 128, to include the MCS field (5 bits) if the maximum HARQ process identifier is up to 512, or to include the MCS and NDI fields if the maximum HARQ process identifier is up to 1024.

FIG. 4 shows an example of a process 40 according to an embodiment of the present disclosure. In the process 40, the BS first sends a higher layer signaling to the UE, to indicate whether the enhanced indication function of the identifiers of feedback processes (e.g. HARQ processes) is enabled. In an example, the UE may determine the enhanced indication function is enabled when the maximum number of feedback processes configured by the BS exceeds a threshold (e.g. 16). Next, the BS transmits scheduling information (e.g. downlink control information (DCI)) to the UE for configuring a scheduling transmission (e.g. PDSCH) and performs the scheduling transmission based on the scheduling information for transmitting data to the UE. After receiving the scheduling information from the BS, the UE determines at least one feedback process identifier corresponding to at least one feedback process (e.g. HARQ process) of the data in order to perform the at least one feedback process. Note that, the method of the UE determining the at least one feedback process identifier changes based on whether the enhanced indication function is enabled, When the enhanced indication function is enabled, the UE determines the at least one feedback process identifier based on not only feedback identifier information (e.g. the HARQ process number field) in the scheduling information but also at least one indicator. According to the determined at least one feedback process identifier, the UE performs the at least one feedback processes and accordingly transmits at least one feedback message (e.g. Acknowledgement/No acknowledgement (ACK/NACK) messages), e.g. in PUCCH, to the BS.

In an example, the at least one indicator may include related indexes of transmitting the data or the scheduling information. For example, the at least one indicator comprises at least one of a system frame index of a system frame transmitting the data or scheduling information of the data, a system frame period value, a maximum feedback process identifier, the number of slots within single frame, a sub-frame index of a sub-frame transmitting the data or the scheduling information of the data, a sub-frame period value, the number of slots in single sub-frame, a slot index of a slot transmitting the data or the scheduling information of the data, the maximum number of sub-frames in single frame, or a scalar value.

In an embodiment, the at least one indicator may include at least one bit of at least one bit field in the scheduling information and the UE determines the at least one feedback process identifier base on a combination of the at least one indicator and the feedback identifier information of the scheduling information. For example, the at least one indicator may include at least one bit of at least one of the NDI field for the first TB, the RV field for the first TB, the NDI field for the second TB, the RV field for the second TB, the MCS field for the second TB, the transport power command field for PUCCH, the PUCCH resource indicator field or PDSCH-to-HARQ feedback timing indicator field. In an example, the at least one indicator may be the higher-order bit (the bit with higher weighting) in the combination. When the at least one indicator includes bits of a plurality of bit fields in the scheduling information, the order of the plurality of bit fields in the combination may be an order of the plurality of bit fields in the scheduling information, an inverse order of the plurality of bit fields in the scheduling information, an ascend order of bit field length of the plurality of bit fields, or a descend order of bit field length of the plurality of bit fields.

In an embodiment, at least one HARQ processes corresponding to the scheduled data may be disabled to meet the requirements of implementing communication systems, e.g., in case of the longer round trip time. In the present disclosure, the HARQ process being disabled means at least parts of operations (e.g., ACK/NACK feedback, buffer flush) of the HARQ process are not performed by the UE. In an embodiment, after receiving the scheduling information for scheduled transmission of scheduled data, the UE may disable at least one HARQ process corresponding to the scheduled data based on at least one higher layer signaling and at least one indicator. In this example, the UE may first determine whether a feedback disabling function of the HARQ process is enabled based on the at least one higher layer signaling, such as at least one of a RRC signaling, a MAC signaling or a SIB signaling. When determining the feedback disabling function is enabled, the UE determines which HARQ processes corresponding to the scheduled data should be disabled based on the at least one indicator. Note that, the UE may determine which HARQ processes corresponding to the scheduled data should be enabled, rather than disabled, based on the at least one indicator. In order to simplify descriptions, the following embodiments use disabling for illustrations. In addition, the feedback disabling function may default to be enabled and the UE may disable the HARQ processes based on the at least one indicator without the higher layer signaling indicating whether the feedback disabling function is enabled.

In an embodiment, the UE may disable all of the HARQ processes of the scheduled data when the at least one indicator is absent. That is, the UE may not feedback ACK/NACK messages corresponding to the scheduled data if the at least one indicator is absent.

In an embodiment, the at least one indicator may indicate a bitmap whose size is the same with the maximum number of supported HARQ process identifiers. Under such a condition, the bitmap is able to indicate a disabling status of each HARQ process identifier (e.g. bit '0' refers to a disabling status and bit '1' refer to an enabling status). As a result, the UE is able to disables the HARQ processes with the HARQ process identifiers corresponding to the disabling status.

In an embodiment, the at least one indicator may indicate a range of the HARQ process identifiers and the UE disables the HARQ processes with the HARQ process identifiers in the indicated range. For example, the at least one indicator may indicate a start identifier and a length and the UE therefore can determines the range of HARQ process identifiers.

In an embodiment, the at least one indicator may indicates at least one HARQ process identifier and the UE disable the HARQ process corresponding to the indicated at least one HARQ process identifier. For example, the at least one indicator may be a list of HARQ process identifiers.

In an embodiment, the at least one indicator may indicate a number N corresponding to the number of disabled HARQ processes. In this embodiment, the UE may disable the HARQ processes corresponding to the first N HARQ process identifiers or the last N HARQ process identifiers.

In an embodiment, the BS may utilize one higher layer signaling to indicate the at least one indicator and utilize another higher layer signaling to adjust (values of) the at least one indicator. For example, the BS may indicates the at least one indicator in the RRC signaling and utilize the MAC signaling to modify the at least one indicator, or vice versa.

FIG. 5 shows an example of a process 50 according to an embodiment of the present disclosure. According to the process 50, the BS transmits at least one higher layer signaling for indicating whether a feedback disabling function corresponding to the at least one feedback process (e.g. HARQ process) is enabled is enabled and/or related at least one indicator. Next, the BS transmits scheduling information of a scheduled transmission (e.g. PDSCH) and performs the scheduled transmission based on the scheduling information, to transmit scheduled data to the UE. Based on the at least one higher layer signaling and the at least one indicator, the UE may disable at least one feedback process (e.g. HARQ process) of the data. The UE may first determine whether the feedback disabling function is enabled based on the at least one higher layer signaling and determines the at least one feedback process required to be disabled/enabled based on the at least one indicator. For example, the UE may disable all of the feedback processes of the data if the at least one indicator is absent. In addition, the UE may determine the at least one feedback process identifier based on the at least one indicator and accordingly disable the at least one feedback process. Next, the UE performs the enabled feedback processes, if any, and transmits corresponded feedback messages (e.g. ACK/NACK messages) to the BS.

Note that, as long as the same results can be required, timings of the abovementioned operations may be appropriately altered. For example, the UE may determine whether the feedback disabling function is enabled and/or the disabled feedback process identifiers no later than receiving the data of the scheduled transmission. In an embodiment, the UE may receive the at least one indicator after determining the disabling function is enabled.

In an embodiment, the BS may utilize at least one higher layer signaling to indicate whether the feedback disabling function is enabled and adopts different methods to determine the disabled HARQ processes instead of using the additional at least one indicator. For example, the UE may determine the disabled HARQ processes based on at least one bit field in the scheduling information of the scheduled transmission, to reduce signal overhead.

In an embodiment, the BS may indicate the whether the HARQ process is disabled/enabled (e.g., feedback) via the presence or absence of one higher layer signaling. For example, for the configuration to UE in discontinuous reception (DRX), if a timer (e.g., drx-RetransmissionTimerDL) which is used to indicate the maximum time waiting for reception of downlink (DL) retransmission is absent, the feedback for the HARQ process associated for transmission in the DRX is disabled, and UE will not conduct the ACK/NACK feedback for the reception of corresponding DL data. In another example, once the DL feedback is disabled, the UE will not expect to be active to receive the additional re-transmission. In still another example, if there is one indicator in the scheduling or configuration information for the UE in the DRX to indicate the existence of retransmission, e.g., the number of following re-transmissions, absence or presence state of re-transmission, the feedback for HARQ process associated with transmission in DRX is disabled and UE will not conduct the ACK/NACK feedback for the reception of DL data. In other example, once the existence of retransmission is indicated to the UE, the UE will expect to be active continuously to receive the additional re-transmission or be active after certain duration (e.g., drx-RetransmissionTimerDL) to receive the re-transmission.

In an embodiment, the UE may determine whether the feedback of HARQ process is enabled or disabled based states of previous scheduling, e.g., whether re-transmission of previous transmission is required or not. For example, during a random access channel (RACH) procedure, if retransmission scheduled for the Msg-3 (Msg-3 refers to PUSCH scheduled by RACH response (RAR) uplink (UL) grant) is required (e.g., scheduling information scrambled by a temporary cell radio network temporary identifier (TC-RNTI) is received by the UE), the feedback of the HARQ process associated to the PDSCH with the UE contention resolution identify is always needed.

In an embodiment, the UE may re-interpret the at least one bit field (including the reserved bit field) of the scheduling information to determine the disabled HARQ processes. For example, the UE may determine the RV field and the NDI field corresponding to each TB of the data to determine the corresponding HARQ process is enabled or disabled. In this example, the UE may determines whether each TB is new (e.g. is first time of being transmitted) based on the NDI field of the TB. For example, the UE may determine a TB is new when determining the NDI field of the TB is toggled when comparing with the NDI field corresponding to the same feedback process identifier of the TB or when the feedback process identifier of the TB first time appears after a MAC entity is reset or initialed.

When determining the TB is new, the UE further determines whether the HARQ process of the TB is disabled based on the RV field of the TB. In an example, the HARQ process of the TB is disabled when the value indicated by the RV field of the TB is 1 and the value of the RV field used for transmitting the TB is determined by XOR(RV, RRC indicator), where the RRC indicator may be the higher layer signaling used to indicate whether the feedback disabling function is enabled. In an example, the UE determines whether the feedback process of the TB is disabled based on XOR(RV, RRC indicator) and the value of the RV field remains to be used for transmitting the TB. In an example of the RV field indicating a value 3, the HARQ process of the TB may be predefined to be enabled or disabled and the value of the RV field is used for transmitting the TB. Moreover, the abovementioned function XOR may be replaced by other functions, such as a function OR.

Note that, XOR(RV, RRC indicator) may be conducted based on the value indicated by RV field. Namely, if the RV field indicates the numerical value 0, the function XOR is conducted between (0, RRC indicator). In another example, XOR(RV, RRC indicator) is conducted between either the MSB or LSB of the RV field. If the RV field is '01' and XOR(RV, RRC indicator) is conduced with the MSB of the RV field and RRC indicator, the output value of XOR(RV, RRC indicator) will be either 01 or 00. In still another example, XOR(RV, RRC indicator) is conducted between all values of the RV field and the RRC indicator. For example, RV field is '00' and the RRC indicator is '0', XOR(RV, RRC indicator) will be conducted between each bit in the RV field and RRC indicator separately.

In an embodiment, the UE may re-interpret the HARQ process number field in the scheduling information for determining the disabled HARQ processes. For example, the UE may use the MSB of the HARQ process number field as the reference of determining the disabled HARQ processes. The UE may determine the HARQ process corresponding to the HARQ process number field with MSB '0' is enabled and determines the HARQ process corresponding to the HARQ process number field with MSB '1' is disabled. In this example, the remaining bits (bits other than MSB) of the HARQ process number field are used to indicate the HARQ process identifiers.

In an embodiment, the UE may re-interpret the PUCCH resource indicator field or PDSCH-to-HARQ feedback timing field to for determining the disabled HARQ processes. The UE may determine the HARQ process of the TB is disabled when determining the PUCCH resource indicator field or PDSCH-to-HARQ feedback timing field is one of special patterns (e.g. 0000 or 1111); otherwise the UE determines the HARQ process of the TB is enabled.

In an embodiment, the UE may determine the HARQ process of the TB is enabled/disabled based on the presence or absence of at least one bit field in the scheduling information. When determining the at least one bit field of the TB is absent, the UE determines the HARQ process of the TB is disabled, and vice versa. The at least one bit field used as the determining reference may be the HARQ process number field, the NDI field, the PUCCH resource indicator field and the PDSCH-to-HARQ feedback timing field.

In an embodiment, the at least one indicator may be other control information. For example, the BS may configure an addition radio network temporary identifier (e.g. X-RNTI) to the UE, to configure the at least one indicator. Or, the at least one indicator may be control-resource set (CORESET) identifications. When the plurality of CORESET identifications are associated to the same search space ID, the HARQ processes corresponding to the plurality CORESET identifications may be disabled. For example, the HARQ processes corresponding to the plurality of CORESET identifications except for the first one appears are disabled. In another example, addition indicators may be introduced in CORESET configurations for indicating whether corresponding HARQ processes are disabled. In still another example, additional bit maps or indicators are configured in search spaces to indicate whether corresponding HARQ processes are enabled.

In an embodiment, the at least one indicator may be at least one bit field in the scheduled data (e.g., transmitted with PDSCH). In this example, the at least one indicator may be a higher order bit (i.e. the bit with greater weighting) when combining with the HARQ process number field. In one example, the bit field of at least one indicator is separately coded with bits located in the PDSCH. In one example, the bit field of at one indicator is allocated closed to the DMRS, e.g., along the first symbol of DM-RS. In one example, the bit field is of at least one indicator is located at first N resource for the PDSCH transmission, which may be expected to be decoded by UE firstly than the remaining bits for PDSCH.

FIG. 6 shows an example of a process 60 according to an embodiment of the present disclosure. As shown in FIG. 6, the BS transmits at least one higher layer signaling for indicating whether the feedback disabling function is enabled, transmits scheduling information of a scheduled transmission (e.g. PDSCH) and performs the scheduled transmission based on the scheduling information to transmit scheduled data to the UE. Before performing feedback processes (e.g. HARQ processes) of the scheduled data, the UE determines whether the feedback disabling function is enabled based on the at least one higher layer signaling. When the feedback disabling function is enabled, the UE disables the feedback processes based on the scheduling information of transmitting the scheduled data. Next, the UE performs the enabled feedback processes, if any, and accordingly transmits feedback messages (e.g. ACK/NACK messages) to the BS.

Note that, as long as the same results can be required, timings of the abovementioned operations can be appropriately modified. In addition, the feedback disabling function may default to be enabled and the UE may disable the HARQ processes based on the scheduling information without determining whether the feedback disabling function is enabled.

In an embodiment, the UE disables the feedback processes based on at least one bit field of the scheduling information. For example, the at least one bit field may be at least one of a NDI field, a RV field, a hybrid automatic repeat request, HARQ, process number field, a physical uplink control channel, PUCCH, resource indicator field or physical downlink shared channel, PDSCH, to HARQ feedback timing indicator field.

In an example, the UE disables the feedback process whose corresponding at least one bit field is absent.

In an example, the UE re-interpret the at least one bit field in the scheduling information to determine the disabled feedback processes. For example, the UE may disable the feedback process based on the corresponding NDI field and RV field. The UE may disable the feedback process when the NDI field of the feedback process indicates the data corresponding to the feedback process is new and the RV field of the feedback process indicates 1, when the NDI field of the feedback process indicates the data corresponding to the feedback process is new and a value of XOR(RV field, RRC indicator) is 1 or when the NDI field of the feedback process indicates the data corresponding to the feedback process is new and the RV field of the feedback process indicates 3.

In an example, the UE disables the feedback process based on a bit (e.g. MSB) of the feedback identifier field (e.g. HARQ process number field) in the scheduling information. The UE may disables the feedback processes having the feedback identifier field whose MSB is '1'.

In an example, the scheduling information comprises at least one of an RNTI (e.g. X-RNTI) or a control-resource set (CORSET) identification for indicating the disabled feedback processes.

FIG. 7 shows an example of a process 70 according to an embodiment of the present disclosure. According to FIG. 7, the UE receives a higher layer signaling of indicating a state of a feedback disabling function and accordingly determines the state of the feedback disabling function. When determining the feedback disabling function is disabled, the UE performs feedback processes (e.g. HARQ processes) as specified in the communication standards. When determining the state of the feedback disabling function is enabled and indicates "static disable", the UE may receive at least one indicator (e.g. at least one higher layer signaling) and accordingly disables the feedback processes. The operations of process 70 after the UE determining the state of the feedback disabling function is enabled and indicates "static disable" are similar to those of the process 50 without determining whether the feedback disabling function is enabled and are not described herein for brevity. When determining the state of the feedback disabling function is enabled and indicates "dynamic disable", the UE may receives scheduling information (e.g. at least one bit field of scheduling information of configuring transmissions) and disables the feedback processes based on the scheduling information. The operations of the process 70 after UE determining the state of the feedback disabling function is enabled and indicates "dynamic disable" are similar to those of the process 60 without determining whether the feedback disabling function is enabled and are not described herein for brevity.

FIG. 8 shows an example of a process 80 according to an embodiment of the present disclosure. According to the process 80, the UE receives scheduling information for performing a scheduled transmission of scheduled data from the BS. Next, the UE determines a condition of at least one feedback process (e.g. HARQ process) associated with the scheduling information, where the condition refers to an identifier of the at least one feedback process, a method to determine the identifier of the at least one feedback process, a state indicating whether the at least one feedback process is enabled, or a method to determine the state indicating whether the at least one feedback process is enabled. After determining the condition of the at least one feedback process associated with the scheduling information, the UE transmits at least one feedback message of the scheduled data based on the condition of the at least one feedback process.

In an embodiment, the UE may further receives at least one higher layer signaling (e.g. at least one of a radio resource control signaling, media access control signaling from the BS, or system information block signaling) as a reference of determining the condition of the at least one feedback process. In an example, base on the at least one higher layer signaling, the UE may determines whether a feedback indication function of the identifier of the at least one feedback process is enabled and determines the identifier of the at least one feedback process based on the scheduling information and at least one indicator when determining the feedback indication function is enabled (e.g. the process 40). In another example, based on the at least one higher layer signaling, the UE may determine whether a feedback disabling function of the at least one feedback process is enabled and determines whether the at least one feedback process is disabled/enabled based on the scheduling information and/or at least one indicator (e.g. the process 50, 60 or 70).

When having larger round-trip time or more parallel data transmissions, the communication system may need to support more HARQ processes. Under such a condition, the present disclosure provides various embodiments of indicating the number of HARQ processes supported by the communication systems and methods of determining the HARQ process identifier. For implementing the communication systems with larger round-trip time or more parallel data transmissions, the present disclosure also discloses various embodiments of an alternative method allowing the UE to disable certain HARQ processes when receiving data from the BS. According to different design concepts, the embodiments shown in the present disclosure may be appropriately altered or modified.

What is claimed is:

1. A wireless communication method, for use in a user equipment, comprising:
    receiving, from a base station, scheduling information for scheduled data; and
    determining at least one feedback process identifier of at least one feedback process associated with the scheduling information for scheduled data based on feedback process identifier information in the scheduling information and at least one indicator, wherein determining the at least one feedback process identifier includes at least one of:
        determining whether an enhanced indication function of identifiers of feedback processes is enabled based on a higher layer signaling, or
        determining the at least one feedback process identifier based on the feedback process identifier information in the scheduling information and the at least one indicator when determining the enhanced indication function of the identifiers of the feedback processes is enabled.

2. The wireless communication method of claim 1, wherein the higher layer signaling includes at least one of a radio resource control signaling, a media access control signaling, or a system information block signaling.

3. The wireless communication method of claim 1, wherein the enhanced indication function is determined to be enabled when a number of feedback processes configured by high layer signaling exceeds a threshold.

4. The wireless communication method of claim 1, wherein the at least one indicator comprises at least one of a system frame index of a system frame transmitting the data or scheduling information of the data, a system frame period value, a maximum feedback process identifier, a number of slots within single frame, a sub-frame index of a sub-frame transmitting the data or the scheduling information of the data, a sub-frame period value, the number of slots in single sub-frame, a slot index of a slot transmitting the data or the scheduling information of the data, the maximum number of sub-frames in single frame, a scalar value, or at least one bit of at least one bit field in the scheduling information.

5. The wireless communication method of claim 4, wherein the at least one feedback process identifier is acquired by:

$$H\_ID = ID\_indicated + mod(SFN\_ID, SFN\_p) * MaxID\_indicated$$

wherein, H_ID is the at least one feedback process identifier, ID_indicated is a non-negative integer acquired based on the feedback process identifier information, SFN_ID is the system frame index of the system frame transmitting the scheduled data or the scheduling information of the scheduled data, SFN_p is the system frame period value and MaxID_indicated is the maximum feedback process identifier; or $$H\_ID = ID\_indicated + mod(SubF\_ID, SubF\_p) * MaxID\_indicated$$

wherein, H_ID is the at least one feedback process identifier, ID_indicated is a non-negative integer acquired based on the feedback process identifier information, SubF_ID is the sub-frame index of the sub-frame transmitting the scheduled data or the scheduling information of the scheduled data, SubF_p is the sub-frame period value and MaxID_indicated is the maximum feedback process identifier; or $$H\_ID = ID\_indicated * Max\_slot\_F + slotID$$

wherein, H_ID is the at least one feedback process identifier, ID_indicated is a non-negative integer acquired based on the feedback process identifier information, Max_slot_F is the number of slots within single frame and slotID is the slot index of the slot transmitting the scheduled data or the scheduling information of the scheduled data; or $$H\_ID = ID\_indicated * Scalar + mod(slotID, Scalar)$$

wherein, H_ID is the at least one feedback process identifier, ID_indicated is a non-negative integer acquired based on the feedback process identifier information, Scalar is the scalar value and slotID is the slot index of the slot transmitting the scheduled data or the scheduling information of the scheduled data.

6. The wireless communication method of claim 5, wherein the slotID is the slot index of the slot transmitting the scheduled data or the scheduling information of the scheduled data in each frame when the scalar value is not larger than the number of slots within single frame and is the slot index of the slot transmitting the scheduled data or the scheduling information of the scheduled data in each sub-frame when the scalar value is not larger than the number of slots within single sub-frame.

7. The wireless communication method of claim 5, wherein, when the scalar value is larger than the number of slots within single frame, the slotID is acquired by:

$$slotID = Max\_slot\_F * SFN\_ID + slotID\_local$$

wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data; or $$slotID = Max\_slot\_F * (SFN\_ID - 1) + slotID\_local$$

wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data.

8. The wireless communication method of claim 4, wherein the system frame index, the sub-frame index or the slot index is adjusted by a ratio when the data and the scheduling information are transmitted by different sub-carrier configurations.

9. The wireless communication method of claim 4, wherein the at least one bit field in the scheduling information comprises a first new data indicator, NDI, field for indicating whether the scheduled data in a first transport block, TB, is new, a first redundancy version, RV, field for a channel coding of the first TB, a second NDI field for indicating whether the scheduled data in a second TB is new, a second RV field for a channel coding of the second TB, a modulation and coding scheme, MCS, field for indicating the modulation and coding scheme of the second TB, a downlink assignment index field, a transport power command field for physical uplink control channel, PUCCH, a PUCCH resource indicator field or physical downlink shared channel, PDSCH, to HARQ feedback timing indicator field.

10. The wireless communication method of claim 9, wherein the at least one indicator is a higher-order bit in a combination of the feedback process identifier information and the at least one indicator, and
   wherein an order of the at least one indicator in the combination of the feedback identifier information and the at least one indicator follows an order of the at least one indicator in the scheduling information, an inverse order of the at least one indicator in the scheduling information, an ascend order of bit field length of the at least one indicator, or a descend order of bit field length of the at least one indicator.

11. A wireless communication method for use in a base station, comprising:
   transmitting, to a user equipment, UE, scheduling information for scheduled data and at least one indicator, wherein at least one feedback process identifier of at least one feedback process associated with the scheduling information for scheduled data is determined based on feedback process identifier information in the scheduling information and the at least one indicator; and
   transmitting, to the UE, a higher layer signaling to indicate an enhanced indication function of identifiers of feedback processes is enabled and to make the UE determine the at least one feedback process identifier of the at least one feedback process associated with the scheduling information for the scheduled data based on the feedback process identifier information in the scheduling information and the at least one indicator.

12. The wireless communication method of claim 11, wherein the higher layer signaling includes at least one of a radio resource control signaling, a media access control signaling, or a system information block signaling.

13. The wireless communication method of claim 11, wherein the enhanced indication function is determined to be enabled when a number of feedback processes configured by a high layer signaling exceeds a threshold.

14. The wireless communication method of claim 11, wherein the at least one indicator comprises at least one of a system frame index of a system frame transmitting the data or scheduling information of the data, a system frame period value, a maximum feedback process identifier, a number of slots within single frame, a sub-frame index of a sub-frame transmitting the data or the scheduling information of the data, a sub-frame period value, the number of slots in single sub-frame, a slot index of a slot transmitting the data or the scheduling information of the data, the maximum number of sub-frames in single frame, a scalar value, or at least one bit of at least one bit field in the scheduling information.

15. The wireless communication method of claim 14, wherein the at least one feedback process identifier is acquired by:

$$H\_ID = ID\_indicated + mod(SFN\_ID, SFN\_p) * MaxID\_indicated$$

wherein, H_ID is the at least one feedback process identifier, ID_indicated is a non-negative integer acquired based on the feedback process identifier information, SFN_ID is the system frame index of the system frame transmitting the scheduled data or the scheduling information of the scheduled data, SFN_p is the system frame period value and MaxID_indicated is the maximum feedback process identifier; or $$H\_ID = ID\_indicated + mod(SubF\_ID, SubF\_p) * MaxID\_indicated$$

wherein, H_ID is the at least one feedback process identifier, ID_indicated is a non-negative integer acquired based on the feedback process identifier information, SubF_ID is the sub-frame index of the sub-frame transmitting the scheduled data or the scheduling information of the scheduled data, SubF_p is the sub-frame period value and MaxID_indicated is the maximum feedback process identifier; or $$H\_ID = ID\_indicated * Max\_slot\_F + slotID$$

wherein, H_ID is the at least one feedback process identifier, ID_indicated is a non-negative integer acquired based on the feedback process identifier information, Max_slot_F is the number of slots within single frame and slotID is the slot index of the slot transmitting the scheduled data or the scheduling information of the scheduled data; or $$H\_ID = ID\_indicated * Scalar + mod(slotID, Scalar)$$

wherein, H_ID is the at least one feedback process identifier, ID_indicated is a non-negative integer acquired based on the feedback identifier information, Scalar is the scalar value and slotID is the slot index of the slot transmitting the scheduled data or the scheduling information of the scheduled data.

16. The wireless communication method of claim 15, wherein the slotID is the slot index of the slot transmitting the scheduled data or the scheduling information of the scheduled data in each frame when the scalar value is not larger than the number of slots within single frame and is the slot index of the slot transmitting the scheduled data or the scheduling information of the scheduled data in each sub-frame when the scalar value is not larger than the number of slots within single sub-frame.

17. The wireless communication method of claim 15, wherein, when the scalar value is larger than the number of slots within single frame, the slotID is acquired by:

$$slotID = Max\_slot\_F * SFN\_ID + slotID\_local$$

wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data; or $$slotID = Max\_slot\_F * (SFN\_ID - 1) + slotID\_local$$

wherein, SFN_ID is the system frame index of the system frame transmitting the scheduled data or the scheduling information of the scheduled data and slotID_local refers to a slot index of the slot in the system frame transmitting the scheduled data or the scheduling information of the scheduled data.

18. The wireless communication method of claim 14, wherein the system frame index, the sub-frame index or the slot index is adjusted by a ratio when the data and the at least one indicator are transmitted by different sub-carrier configurations.

19. The wireless communication method of claim 14, wherein the at least one bit field in the scheduling information comprises a first new data indicator, NDI, field for indicating whether the scheduled data in a first transport block, TB, is new, a first redundancy version, RV, field for a channel coding of the first TB, a second NDI field for indicating whether the scheduled data in a second TB is new, a second RV field for a channel coding of the second TB, a modulation and coding scheme, MCS, field for indicating the modulation and coding scheme of the second TB, a downlink assignment index field, a transport power command field for physical uplink control channel, PUCCH, a PUCCH resource indicator field or physical downlink shared channel, PDSCH, to HARQ feedback timing indicator field,
  wherein the at least one indicator is a higher-order bit in a combination of the feedback process identifier information and the at least one indicator, and
  wherein an order of the at least one indicator in the combination of the feedback process identifier information and the at least one indicator follows an order of the at least one indicator in the scheduling information, an inverse order of the at least one indicator in the scheduling information, an ascend order of bit field length of the at least one indicator, or a descend order of bit field length of the at least one indicator.

20. A network device comprising:
a communication unit configured to receive, from a base station, scheduling information for scheduled data; and
a processor, configured to determine at least one feedback process identifier of at least one feedback process associated with the scheduling information for scheduled data based on feedback process identifier information in the scheduling information and at least one indicator, wherein determining the at least one feedback process identifier is further configured to:
  determine whether an enhanced indication function of identifiers of feedback processes is enabled based on a higher layer signaling, or
  determine the at least one feedback process identifier based on the feedback identifier information in the scheduling information and the at least one indicator when determining the enhanced indication function of the identifiers of feedback processes is enabled.

* * * * *